US 6,616,174 B2

(12) United States Patent
Bierma

(10) Patent No.: US 6,616,174 B2
(45) Date of Patent: Sep. 9, 2003

(54) SACK TROLLEY

(76) Inventor: Jochum Bierma, Schablederweg 54 A 4040, Linz (AT)

( * ) Notice: Subject to any disclaimer, the term of this patent is extended or adjusted under 35 U.S.C. 154(b) by 0 days.

(21) Appl. No.: 09/966,579

(22) Filed: Sep. 27, 2001

(65) Prior Publication Data

US 2002/0043784 A1 Apr. 18, 2002

(30) Foreign Application Priority Data

Sep. 28, 2000 (AT) ........................................ 713/2000 U

(51) Int. Cl.$^7$ ................................................ B62B 7/00
(52) U.S. Cl. .................... 280/655; 280/652; 280/655.1; 280/47.27; 280/47.315
(58) Field of Search ............................. 280/655, 655.1, 280/47.315, 47.371, 652, 47.27; 16/438, 436, 900, 445, 324, 325, 430; 403/DIG. 4, 87, 91, 409.1

(56) References Cited

U.S. PATENT DOCUMENTS

| | | | | |
|---|---|---|---|---|
| 3,534,432 A | * | 10/1970 | Davies et al. ................. | 16/437 |
| 5,168,601 A | * | 12/1992 | Liu .............................. | 16/445 |
| 5,184,835 A | * | 2/1993 | Huang ................... | 280/47.371 |
| 5,319,992 A | * | 6/1994 | Shui-Te ........................ | 74/543 |
| 5,439,239 A | * | 8/1995 | Su ............................... | 280/40 |
| 6,000,712 A | * | 12/1999 | Wu .............................. | 280/639 |
| 6,101,678 A | * | 8/2000 | Malloy et al. ................ | 16/438 |
| 6,345,836 B1 | * | 2/2002 | Wu ............................. | 280/651 |
| 2002/0043784 A1 | * | 4/2002 | Bierma ........................ | 280/652 |

FOREIGN PATENT DOCUMENTS

DE          40 36 323          1/1992

* cited by examiner

Primary Examiner—Brian L. Johnson
Assistant Examiner—J. Allen Shriver
(74) Attorney, Agent, or Firm—Collard & Roe, P.C.

(57) ABSTRACT

A sack trolley (1) presents a support frame (2) accommodating lower carrying wheels (3) and an upper handle (4) which is articulated to the lower ends of its side spars (5) by way of hinges (6) on the upper ends of the side legs (7) of the support frame (2) to pivot about a transverse axis (A) parallel to the axis (R) of the carrying wheels, and can be fixed at least in a folded transport position and in an extended use position relative to the support frame (2). To adapt the sack trolley (1) readily to various usage and operating conditions both hinged sections (9, 10) which can be swiveled against one another can be braced with one another by interposition of two interengaging groups of friction discs (15, 16), one of which disc groups (15) is connected torsionally to one hinged section (9) and the other disc group (16) is connected torsionally to the other hinged section. By means of these two hinges (6) the handle (4) relative to the support frame (2) can be swiveled from a foldedback transport position into an extended use position relative to the support frame (2) and via this into an end position angled obliquely forwards.

2 Claims, 3 Drawing Sheets

SACK TROLLEY

FIELD OF THE INVENTION

The present invention relates to a sack trolley with a support frame accommodating lower carrying wheels and an upper handle, which is articulated to the lower ends of its side spar by way of hinges on the upper ends of the side legs of the support frame to pivot about a transverse axis parallel to the axis of the carrying wheels, and can be fixed at least in a folded transport position and in an extended use position relative to the support frame, such that both hinged sections of the hinges which can be swiveled against one another can be braced with one another by interposition of two interengaging groups of friction discs, one of which disc groups is connected torsionally to one hinged section and the other disc group is connected torsionally to the other hinged section.

DESCRIPTION OF THE PRIOR ART

U.S. Pat. No. 6,101,678 discloses such a handle for a portable trolley. One disc group is connected torsionally to one hinged section and the other disc group is connected torsionally to the other hinged section. The disadvantage here, though, is that each disc group must be attached flexibly to attach the handle relative to the support frame of the trolley. Sack trolleys are equipped with a folding handle so that the dimensions of the trolley can be reduced and the trolley can be better stored and transported in terms of saving space. For this purpose the handles are swivel-mounted on the support frame of the trolley by means of hinges and can be fixed either in a position for use or in a transport position by a catch mechanism by means of trunnions or the like. This mostly leads to a somewhat involved displacement and locking procedure and, most of all, any adaptation of the handle position to the respective trolley use or to the trolley operator proves impossible.

SUMMARY OF THE INVENTION

The object of the invention is to develop a sack trolley of the type initially described, which can be adapted easily and quickly to various usage and operating conditions and whose handle can be attached practically with one hand grip, independently of its swivel position.

The invention solves this task by the fact that of the two hinges the hinged sections facing one another are supported by way of an intermediate pipe inserted coaxially to the transverse axis and the hinged sections facing away from one another can be braced against one another by way of a pulling bolt guided through the intermediate pipe.

This makes it possible to brace both hinged sections against one another jointly with one hand grip by impinging with a corresponding tension force of the pulling bolt, with screwing of the pulling bolt being provided by means of an appropriate wing nut or a hand-operated tension cam engaging in the pulling bolt. The discs serve to block the hinges and on account of their plurality they offer friction surfaces utilizable on friction discs, such that slight gripping power results in the hinges being blocked and thus in the handle being fixed tight. The handle can also be fixed in any swivel position, by means of which the sack trolley can best adapt to the respective conditions. At the same time it is particularly advantageous if the handle can be swiveled into an end position angled obliquely forwards, since such a handle position, especially when the sack trolley is loaded, allows a balanced position to be held with the user able to maintain an upright posture when traveling up or down steps.

For easy attachment of the hinged sections to the handle or to the support frame the hinged sections present connecting sleeves for plug-in connection or terminal plates for screw connection to their side spars or legs.

BRIEF DESCRIPTION OF THE DRAWING

The drawing illustrates the inventive object by way of example, in which.

DESCRIPTION OF THE PREFERRED EMBODIMENT

Figure 1:
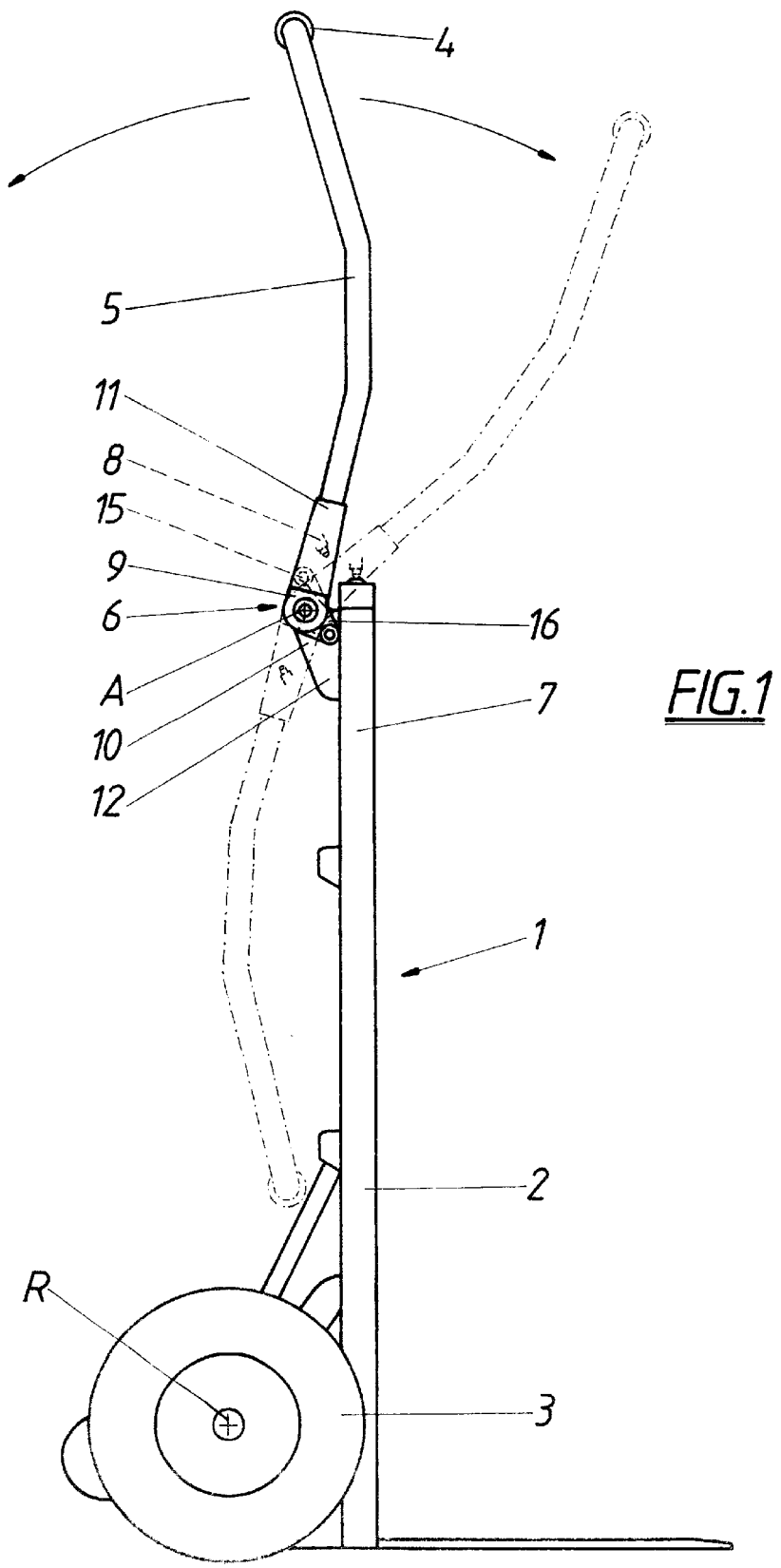
FIG. 1 shows a sack trolley according to the present invention in side view.
Figure 2:
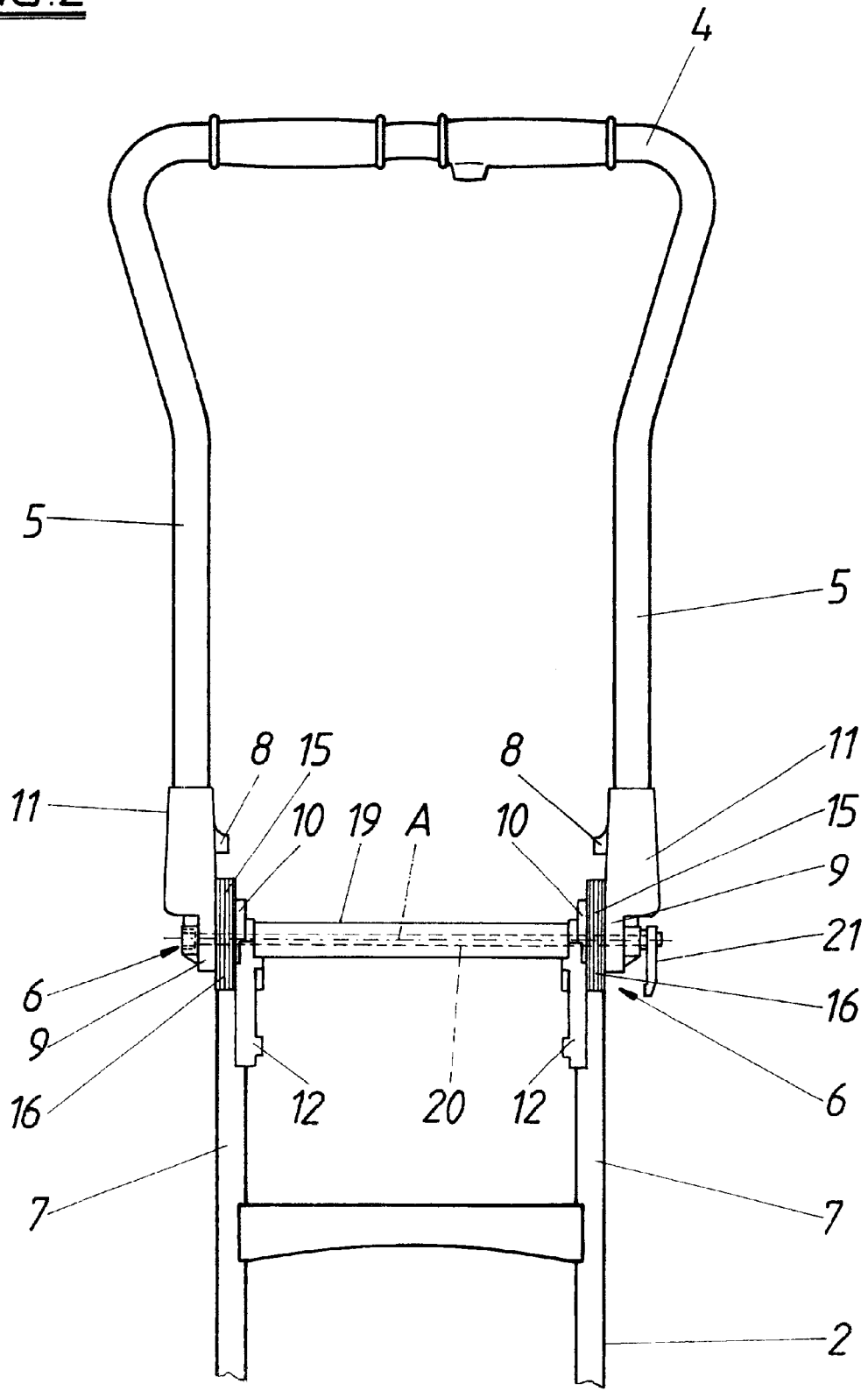
FIG. 2 shows a section of the support frame with the handle of said sack trolley in a front view and on an enlarged scale.
Figure 3:
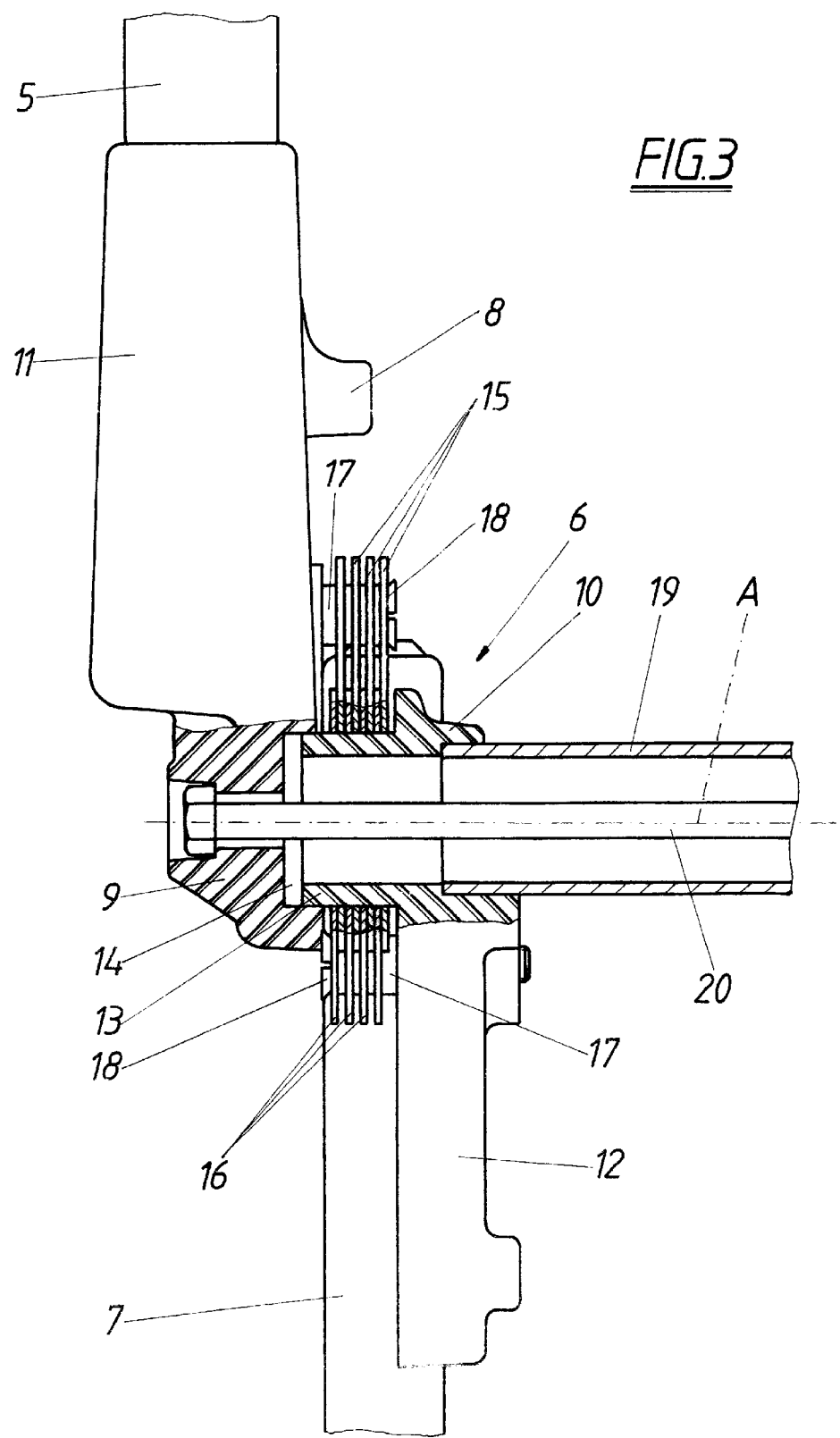
FIG. 3 shows a hinge of the handle linking on the support frame in a partial section front view also on an enlarged scale.

A sack trolley 1 comprises a support frame 2 having lower carrying wheels 3 and an upper handle 4. Handle 4 is articulated to the lower ends of its side spars 5 by means of hinges 6 on the upper ends of side legs 7 of support frame 2 to pivot about a transverse axis A parallel to the axis of carrying wheels R, and can be swiveled from the extended use position relative to support frame 2 into an end position angled obliquely forwards and determined by a stop 8 and also into a folded-back transport position and can be fixed variably within this swiveling range, as indicated by dashed lines in FIG. 1.

The hinges 6 each comprise two hinged sections 9, 10, of which hinged sections 9 are attached by way of connecting sleeves 11 to side spars 5 of handle 4 and hinged sections 10 are attached by way of terminal plates 12 on side legs 7 of support frame 2. Hinged section 10 sits by means of a pivot pin 13 in a corresponding hinge borehole 14 of hinged section 9 and both hinged sections 9, 10 can be braced with one another by interposition of two interengaging groups of friction discs 15, 16, with one of said disc groups 15 being connected torsionally to hinged section 9 and the other disc group 16 being connected torsionally to hinged section 10 by means of distance sleeves 17 and fastening screws 18. For bracing the hinged sections of both hinges 6 an intermediate pipe 19 is inserted between both hinged sections 10 facing one another and coaxial to transverse axis A, on which both hinged sections 10 are supported, and hinged sections 9 facing away from one another are braced together by means of a pulling bolt 20 guided through intermediate pipe 19 and a screw-adjusted tension nut 21. Handle 4 can be fixed in any given swivel position relative to support frame 2 by this tension, such that sack trolley 1 can be adapted to any usage and operating conditions.

What is claimed is:

1. A sack trolley comprising
   (a) a support frame having two side legs having upper ends and carrying wheels at lower ends thereof, the carrying wheels being rotatable about a transverse axis,
   (b) a handle having two side spars having lower ends,
   (c) hinges connecting the lower ends of the side spars to the upper ends of the side legs and enabling the handle to be pivoted about a transverse axis extending parallel to the transverse axis about which the carrying wheels are rotatable between fixed folded and an extended use positions relative to the support frame, the hinges comprising
(1) first hinge sections facing each other,
(2) second hinge sections facing away from each other, the hinge sections being pivotal relative to each other,
(3) two interengaging groups of friction discs interposed between the hinge sections, one of the groups of it friction discs being torsionally connected to the first hinge section and the other group of friction discs being torsionally connected to the second hinge Section, (d) an intermediate pipe extending coaxially with the transverse axis, about which the handle is pivotal, between and supporting the first hinge sections, and (e) a clamping bolt extending coaxially through the pipe between and supporting the second hinge sections.

2. The sack trolley of claim 1, further comprising terminal plates attaching the first hinge sections to the side legs of the support frame and sleeves providing plug-in connections for the second hinge seconds.

* * * * *